US006427820B1

(12) United States Patent
Korner et al.

(10) Patent No.: US 6,427,820 B1
(45) Date of Patent: Aug. 6, 2002

(54) TRANSMISSION UNIT

(75) Inventors: Tillmann Korner, Zang; Achim Paul Schieder, Krummennaab, both of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/601,164

(22) PCT Filed: Dec. 2, 1999

(86) PCT No.: PCT/EP99/09366
§ 371 (c)(1),
(2), (4) Date: Aug. 16, 2000

(87) PCT Pub. No.: WO00/32963
PCT Pub. Date: Jun. 8, 2000

(30) Foreign Application Priority Data

Dec. 3, 1998 (DE) ......................... 198 55 762

(51) Int. Cl.⁷ ..................... F16H 57/02; F16D 55/36; F16D 67/04
(52) U.S. Cl. .................. 192/70.19; 192/70.28; 192/85 AA; 192/109 R; 74/606 R
(58) Field of Search .................. 192/70.19, 70.28, 192/85 AA, 109 R, 112, 115; 74/606 R; 475/146

(56) References Cited

U.S. PATENT DOCUMENTS 3,475,992 A   11/1969  West, Jr. et al. ............ 74/759
3,877,321 A * 4/1975  Storer, Jr. ................ 475/146
5,653,321 A   8/1997   Takaoka et al. ......... 192/70.17

FOREIGN PATENT DOCUMENTS

EP   0 757 189    2/1997
GB   1 411 361    10/1975
WO   WO 00/32965 A1 * 6/2000

OTHER PUBLICATIONS

G. Nitescu, "Four–Speed Planetary Gearbox for Passenger Vehicles with Hydrodynamic Torque Converter as Power Dividers," Automobil–Industrie 5/85.
M. Bucksch, ZF–5–Speed Automatic Transmission for Passager Vehicles (5HP 18) (date unknown).
W. Klement, "Development of the Voith–DIWA Transmission" (date unknown).

* cited by examiner

Primary Examiner—Richard M. Lorence
(74) Attorney, Agent, or Firm—Baker & Daniels

(57) ABSTRACT

A transmission having a gear component with a gear housing with a housing cover allocated in axial direction to the housing in installation position. The gear housing has an essentially cylindrical interior space for the reception of individual gear elements. The gear unit includes a device for the at least indirect resetting of actuating elements of non positive coupling and/or braking arrangements with at least two friction surface-carrying elements, the friction surfaces of which are connectable with one another over a further friction surface-carrying intermediate element. The unit is characterized by the following features: there are provided at least two bar-form elements for the tying-on of a single gear element in first position with respect to the housing and/or the device for the at least indirect resetting of the actuating elements of non positive coupling and/or braking arrangements; the bar-form elements are allocated to the interior space outside of the zone of the greatest dimension of the cylindrical interior space, in height direction in installation position; the housing cover is free from axial force action through the device for the at least indirect resetting of the actuating elements and/or of the gear elements.

14 Claims, 3 Drawing Sheets

TRANSMISSION UNIT

BACKGROUND OF THE INVENTION

1. Field of the Invention

The invention relates to a gear unit, in particular a gear unit with the features from the generic term of claim 1.

2. Description of the Related Art

Gear components are known in a large number of executions. These can be constructed as
a) mechanical gear unit
b) a hydrodynamic-mechanical compound gear unit.

Hydrodynamic-mechanical compound gear units are known, for example, from the following publications:

Buksch, M.: ZF five-gear automatic gears for passenger cars, VDI report 878 (1991).

Mitescu, G: Four-gear planetary gears for passenger automobiles with the hydrodynamic torque converter in the power branch. Automobilindustrie (1985) 5, pages 597–601.

Klement, W.: The development of the Voith-DIWA gears, Verkehr und Technik (1987) 7, pages 301–303.

The gear units which have either only purely mechanical transmission components or else that consist of a hydrodynamic coupling with a downstream mechanical gear set have, as a rule, a housing which with regard to its inner contour, is adapted to the formation and attachment to the housing of the individual gear elements and they have, as a rule, inner insets which undesirably reduce the inside diameter. The actuation of the individual switching arrangements occurs, as a rule, by pressure action over hydraulic pistons. For the resetting on releasing of the braking or coupling arrangements in these systems there is provided in each case either a large cup spring which is active on a piston, or a large number of individual pressure springs that are arranged on a carrier plate and again act on a piston. The pressure springs there, always viewed in radial direction, are arranged in a zone outside of the radial extent of the braking or coupling arrangements, or in the zone of the outer circumference they extend in axial direction into a zone which lies radially within the construction space prescribed by the coupling or braking arrangement. The supporting occurs there either on projections of the housing inner wall or, further the housing cover is used for the support in axial direction. This, however, has the disadvantage that by reason of the forces acting on the housing cover, a sealing-off is possible only with additional expenditure, and the housing cover likewise has to be secured in axial direction with respect to the rest of the gear housing. The basic gear then no longer be. can tested without housing cover but only in the installation state. Furthermore, angle drives are connectable only with difficulty to the gear output shaft since these, as a rule, likewise do not operate piston-free.

Underlying the invention, therefore, was the problem of developing a gear unit in which the disadvantages mentioned are avoided. In particular, the focus is to be set on a simpler housing formation as well as on a simple sealing and fastening of the housing cover to the gear housing. A testing of the gear is also to be possible when the housing is in the open state.

BRIEF SUMMARY OF THE INVENTION

According to the invention the tying-on of the device for the resetting of the actuating elements, especially of the cylinder-piston arrangement as well as of individual gear elements into fixed position on the housing occurs by means of at least two means in the form of bar-form guide elements for the tying-on of gear elements in radial direction or in peripheral direction. These extend there essentially over a zone in which the gear elements provided for the tying-on are arranged. The bar-form guide elements are associated to the cylindrical interior space and are arranged in a zone outside of this, the allocation occurring in such manner that the bar-form guide elements are provided outside of this zone which, as viewed in installation position of the gear, corresponds to the greatest dimension of the cylindrical interior space of the gear unit in height direction.

Imperatively required are only two bar-form elements, but four are also possible. The arrangement occurs in this case as viewed in the cross section of the gear housing, in the corner zones, which is describable by the section size between the cylindrical interior space and a theoretically generatable quadrate with a side dimension greater than or equal to the diameter of the interior space, the theoretically generatable quadrate and the interior space having identical axes of symmetry. In this case, especially with a rectangular housing with cylindrical interior space,the material-intensive corner zones are used for the reception of the guide elements. The arrangement of the guide elements occurs thus outside of the middle vertical elements. The guide elements are guided there in recesses which are connected with the cylindrical interior space. Preferably, however, the arrangement of the guide elements always occurs symmetrically. This offers the advantage that the production expenditure for the gear elements and the gear housing can be minimized; furthermore this also applies to the assembling expenditure, since it is not necessary to heed how the individual recesses or passage openings have to be formed for the reception of the guide elements.

As gear elements there can be regarded, for example, braking arrangements in the form of lamellar brakes, partitions, actuating elements for braking or coupling arrangements, for example in the form of pistons, lamella carriers or the like.

The bar-form element s preferably have an equal or constant diameter over their axial extent. This offers the advantage that the assembling can occur independently from the installation direction of the bar-form elements. There is also conceivable, however, according to the formation of the total gear unit, the use of bar-form elements with different diameter over the axial extent. In this case, however, as a rule an assembling will occur from two side.

The cross section of the bar-form guide element is preferably circular. Also conceivable, however, are forms of execution with a quadrilateral cross section or an arbitrary cross section.

In respect to the bearing of the bar-form guide elements the following variants can be applied:
a) Bearing on the housing in housing wall projections
b) Bearing in partitions which are threaded onto the guide elements
c) Suspended bearing on a wall projection or a partition.

The gear unit can be constructed as a purely mechanical gear unit. In this case each bar-form guide element extends preferably over the entire axial extent of the gear component. In the execution of the gear unit as a hydrodynamic-mechanical compound gear unit, the bar-form guide elements are provided with an axial length which at least corresponds to the axial extent of the mechanical gear part with respect to the total gear unit. It is always necessary, however, that the axial extent of the guide elements corresponds to the axial extent of the gear elements to be supported on these.

These statements hold analogously also for the devices for the resetting of the actuating elements, of lamellar coupling and braking arrangements.

Between the two friction surface-carrying elements which are pressable on one another over a friction surface-carrying element, there is provided at least one spring storage arrangement which is likewise guided over the bar-form guide elements, and is designed in such manner that on generation of the frictional closure between the friction surface-carrying elements and the intermediate element the spring storage arrangement is pre-tensionable. The function of friction surface-carrying elements there can be taken over both by the outer as well as also by the inner lamellae. By reason of the action of the spring storage unit found between the individual friction surface-carrying elements, on relaxation of the actuating elements in each case a opposite force acts on the friction surface-carrying elements, so that a rapid separation becomes possible with complete releasing of the friction closure. The spring storage arrangements, therefore, act indirectly on the actuating element over the friction surface-carrying elements on the actuating element. The actuating element itself can be executed, for example, as a piston which can be acted upon hydraulically or pneumatically. This possibility of arranging the spring storage units between the friction surface-carrying elements offers the advantage that the dimensions of the friction surface-carrying elements in radial direction is no longer dependent on the size of the inner dimensions of the gear housing, with account taken of the necessary construction space for the device for the at least indirect resetting of actuating elements. The arrangement of spring storage units between the friction surface-carrying elements connectable with one another over an intermediate element offers also the advantage of a space-saving execution of the resetting device in axial direction, which again affects the gear length in use of the braking arrangements in lamellar construction in a gear. In regard to the arranging of the spring units between the friction surface-carrying elements a large number of possibilities are conceivable:

a) Arrangement of spring units between each of two adjacent friction surface-carrying elements;
b) Arrangement of the spring units in force flow direction between the friction surface-carrying elements in the zone of the force introduction (in the zone of the in each case outside-lying friction surface-carrying elements with respect to the installation position of the braking arrangement in a gear unit);
c) Arrangement of the spring unit between two adjacent friction surface-carrying elements with respect to the axial extent of the braking arrangement in the middle zone of these;
d) Arrangement according to b) in combination with c).

As spring storage units there are preferably used spring elements which have a characteristic-line characteristic with an essentially constant force flow over a certain spring path. Preferably, therefore, cup springs are used. The execution of the spring units as a shaft spring ring is likewise thinkable. The actuating arrangements used can be executed as cylinder-piston devices which can be acted upon hydraulically or pneumatically. According to the arrangement of the piston for the resetting device over the friction surface-carrying elements, lamellae on the piston are especially effective, either in the zone of the piston surface or outside of the piston surface. In respect to the formation of the piston there are distinguished forms of execution with
a) one piston
b) a plurality of pistons.

The appertaining cylinders there can be formed by one cylinder-carrying element or by a plurality of cylinder-carrying elements. This possibility of the piston resetting offers the advantage of a minimal space requirement in radial as well as in axial direction. In combination with the solution according to the invention there is given the possibility of creating a gear unit in which the torque transfer can take place with constant-remaining structural size, or with reduced structural size.

BRIEF DESCRIPTION OF THE SEVERAL VIEWS OF THE DRAWINGS

The solution according to the invention is explained in the following with the aid of figures. In these the following is represented:

FIG. 1b Longitudinal cross-section of a portion of the inventive gear unit of FIG. 1a.

FIG. 1 explains the solution according to the invention by way of an example with the aid of a certain gear type in axial section. The gear unit is executed as a hydrodynamic-mechanical compound gear unit 1.

DETAILED DESCRIPTION OF THE INVENTION

Figure 1A:
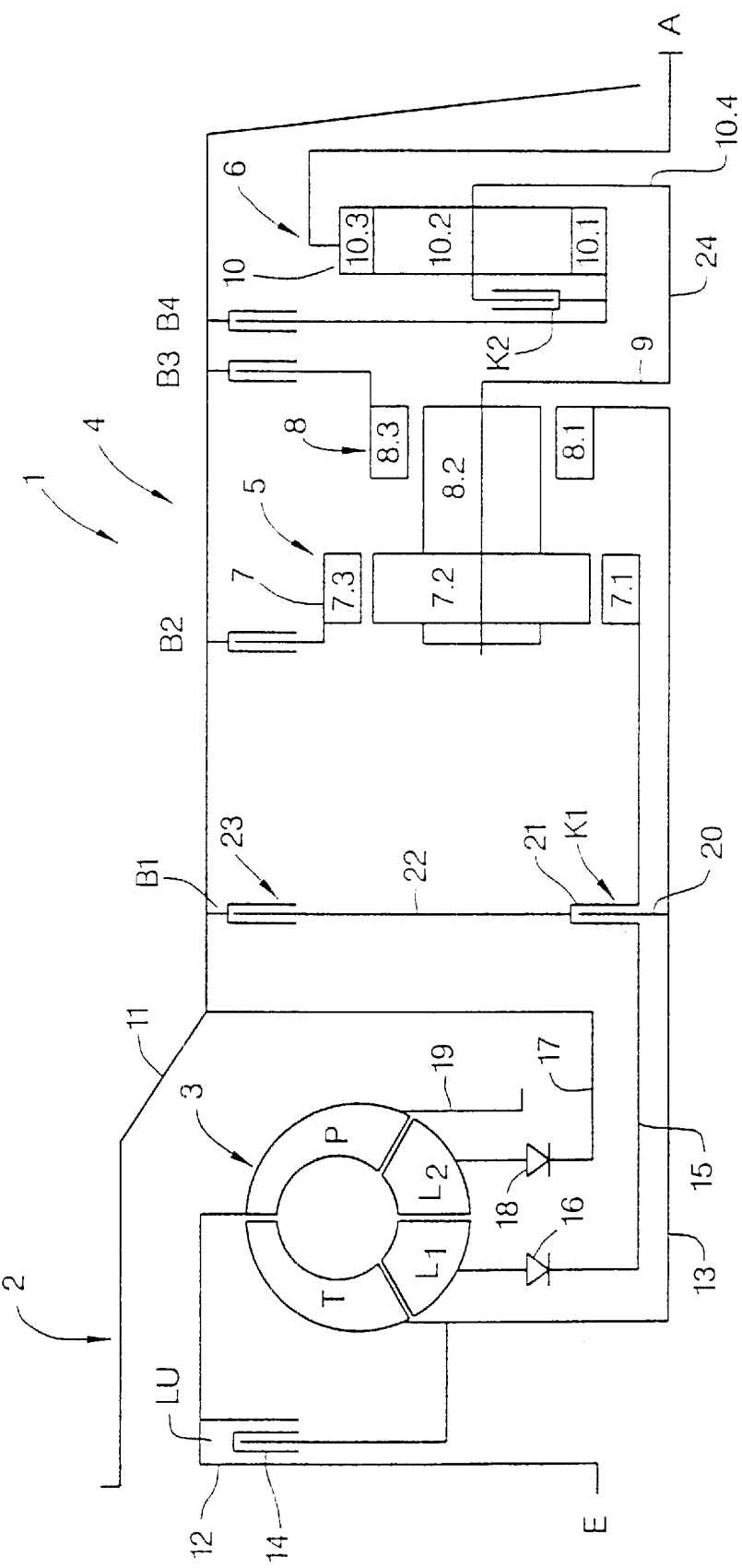
FIG. 1a Schematic diagram of the inventive gear unit.

The hydrodynamic-mechanical compound gear unit 1 comprises a first hydrodynamic gear part 2 in the form of a hydrodynamic speed/torque converter 3 and a second mechanical gear part 4. The mechanical gear part 4 comprises a mechanical speed/torque converter 5, and a group set engaged downstream of this in force flow direction in traction operation. The mechanical speed/torque converter 5 is executed as a modified Ravigneaux planetary wheel set. This comprises a first planetary wheel set 7 and a second planetary wheel set 8, which have a planetary wheel carrier 9 used in common. This presents the coupling between a gear element of the first and of the second planetary wheel set. The first planetary wheel set 7 comprises a sun wheel 7.1, planetary wheels 7.2, and a hollow wheel 7.3. The second planetary wheel set 8 comprises a sun wheel 8.1, planetary wheels 8.2, and a hollow wheel 8.3

The group set 6 comprises at least one planetary wheel set 10, which has a sun wheel 10.1, planetary wheels 10.2, a hollow wheel 10.3, and a web 10.4.

The hydrodynamic-mechanical speed/torque converter 3 comprises a turbine wheel T, a pump wheel P, a first guide wheel L1 and a second guide wheel L2, and is covered by a housing 11. The pump wheel P is connected with a gear input shaft E, which is couplable at least indirectly with a drive machine serving for the drive, preferably with a flywheel 12 of an internal combustion engine,in such manner that the force is transmitted from the flywheel 12 onto the pump wheel P. The turbine wheel T is untwistably connected with a turbine wheel shaft 13. In order to use the advantages of the hydrodynamic torque transmission with bridging coupling, which advantages would be the following:

automatic stageless setting-in of the relation between the drive and off drive speed in correspondence to the load on the off drive side;

Availability of the maximal torque for a starting operation with high acceleration;

Possibility of lead-off by foreign (outside ?) or surface cooling;

Separation of the hydrodynamic speed/torque converter from the off drive, especially from the vehicle, at low drive speeds and transmission of a low residual torque, so that a choking of the drive machine from the off drive side is not possible Wear-free power transfer and simultaneously to avoid the disadvantages of a hydrodynamic power transfer, which lie essentially in an often not sufficiently attainable efficiency range to make it possible to operate with a hydrodynamic gear alone, since power loss constituents that are composed of frictional and impact losses, reduce the transferable total power, and the conversion ranges achieved for the vehicle operation are often insufficient, the hydrodynamic speed/torque converter 3 is used only in the lower gear stages, preferably only during the starting operation, for the power transfer. For the improvement of the transmission efficiency, therefore, the hydrodynamic speed/torque converter 3 is taken out of the power transfer, preferably by bridging. For this purpose a bridging coupling 14 is arranged between the turbine wheel T and the flywheel 12, or the gear input shaft.

The first guide wheel L1 is arranged on the turbine side between the turbine wheel T and the pump wheel P, and it is reversibly borne by a bearing. The first guide wheel L1 is untwistably connectable with a first guide wheel shaft 15, there being provided between the first guide wheel L1 and the guide wheel shaft 15 a freewheeling 16, which is laid out in such manner that it transfers a torque to the first guide wheel shaft 15 when the first guide wheel L1 turns in reverse direction, i.e. in a direction of rotation opposite the direction of rotation of the turbine wheel T, and it runs with no load when the first guide wheel L1 rotates in normal direction, i.e., in the same direction of rotation as the turbine wheel T. The second guide wheel L2 is arranged between the turbine wheel T and the pump wheel P on the pump side, and it is couplable over a second guide wheel shaft 17 with the housing 11. Between the second guide wheel L2 and the second guide wheel shaft 17 there is arranged a second freewheeling 18, by means of which the second guide wheel L2 can be coupled with the second guide wheel shaft 17, but only when that second guide wheel L2 rotates in a direction opposite to the rotation direction of the turbine wheel T.

The pump wheel P is untwistably joined with a pump wheel shaft 19 which is turnably borne over a bearing in the housing 11.

For the execution of the individual gear stages and the laying-out of the individual gears, switching elements are allocated to the individual elements of the hydrodynamic-mechanical compound gear unit 1. Between the hydrodynamic gear part 2 and the mechanical gear part 4 there are provided a first coupling arrangement K1 and a first braking arrangement B1.

The turbine wheel T and the turbine wheel shaft 13 couplable untwistably with it, are coupled with the sun wheel 8.1 of the second planetary wheel set 8 of the mechanical speed/torque converter 5. Preferably the turbine wheel T and the sun wheel 8.1 of the second planetary wheel set 8 are arranged on a common shaft, here the turbine wheel shaft 13; the turbine wheel shaft 13 also carries there the coupling disk 20 of the first coupling K1. The first coupling K1 has, further, a coupling covering 21, which is coupled with the first guide wheel shaft 15. Furthermore, the first guide wheel L1 is connectable over the first guide wheel shaft 15 with the sun wheel 7.1 of the first planetary wheel set 7 of the mechanical speed/torque converter 5. The coupling covering 21 there is preferably connected as one piece with the first guide wheel shaft 15. The first guide wheel shaft 15 is executed as a hollow shaft which encloses the guide wheel shaft 13 in circumferential direction.

With the coupling covering 21 of the first coupling K1 there is connected a preferably disk-shaped element 22 that forms with this a constructive unit, on the outer circumferential zone 23 of which the first braking arrangement B1 can engage. The first braking arrangement B1 serves there for the fixing in position of the first guide wheel L1 over the guide wheel shaft 15 and/or of the first sun wheel 7.1 of the first planetary wheel set 7 of the mechanical speed/torque converter 5. Further switching elements, here the switching elements in the form of braking arrangements B2 and B3, are allocated to the individual planetary wheel sets 7 and 8 of the mechanical speed/torque converter 5. In the case represented the second braking element B2 is allocated to the hollow wheel 7.3 of the first planetary wheel set 7, and the third braking element B3 is allocated to the hollow wheel 8.3 of the second planetary wheel set 8 of the mechanical speed/torque converter 5. The coupling of the mechanical speed/torque converter 5 with the gear input shaft E over the hydrodynamic speed/torque converter 3 or its bridging over the bridging coupling 14, occurs there by coupling of the turbine wheel T or of the turbine wheel shaft 13 with a first gear element of the mechanical speed/torque converter 5 and of the first guide wheel L1 with a further second gear element of the mechanical speed/torque converter 5. As first gear element of the mechanical speed/torque converter 5 there functions here the sun wheel 8.1 of the second planetary wheel set 8. As second gear element there functions the sun wheel 7.1 of the first planetary wheel set 7. The shafts coupled with the two sun wheels 7.1 and 8.1, here the first guide wheel shaft 16 and the turbine wheel shaft 13, function as input shafts of the mechanical speed/torque converter 5. A further third gear element is connected with the gear output shaft A over the group set 6. As third gear element there functions the planetary carrier 9, which is used in common by both planetary wheel sets 7 and 8. The third gear element of the mechanical speed/torque convert 5 is connected with the input which is formed by a first gear element of the group set 6. Preferably this connection is achieved over a twist-free coupling of the third gear element of the mechanical speed/torque converter 5 and first gear element of the group set 6. Both are preferably arranged on a common connecting shaft 24. The first gear element of the group 6 is formed by its planetary carrier 10.4. A second gear element of the group set 6 is connected twist-free with the gear output shaft A of the hydrodynamic-mechanical compound gear unit 1. As second gear element there functions in the case represented the hollow wheel 10.3 of the planetary wheel set 10 of the group set 6. While the mechanical speed/torque converter 5 serves in combination with the speed/torque converter 3 for the execution of three gear stages, by combination of the hydrodynamic speed/torque convert 3, of the mechanical speed/torque convert 5 with the group Set 6, in the case represented six gear stages can be achieved. For this purpose to the group set 6 in each case there are allocated a further coupling arrangement, here the second coupling arrangement K2 and a further braking arrangement, here the fourth braking arrangement B4. The fourth braking element serves there for the fixing into position of the sun wheel 10.1 of the group set 6. The second coupling arrangement K2 makes possible the rigid coupling between the planetary carrier 10.4 and the sun wheel 10.1 of the planetary wheel set 10 of the group set 6.

From the axial section of the gear unit 1 it becomes evident how individual gear elements which are fastened to or borne on the housing, are fastened to the housing 11 in the manner of the invention. The individual braking arrangements B1 to B4 are executed in laminar construction type. These comprise at least in each case two friction surface-carrying elements, which are joined with one another with friction closure over a friction surface-carrying intermediate element. The friction surface-carrying elements are designated there for the individual braking arrangements as follows:

B1: B11, B12, B1n
B2: B21, B22, B2n
B3: B31 B32, B3n
B4: B41, B42, B4n

Figure 2:
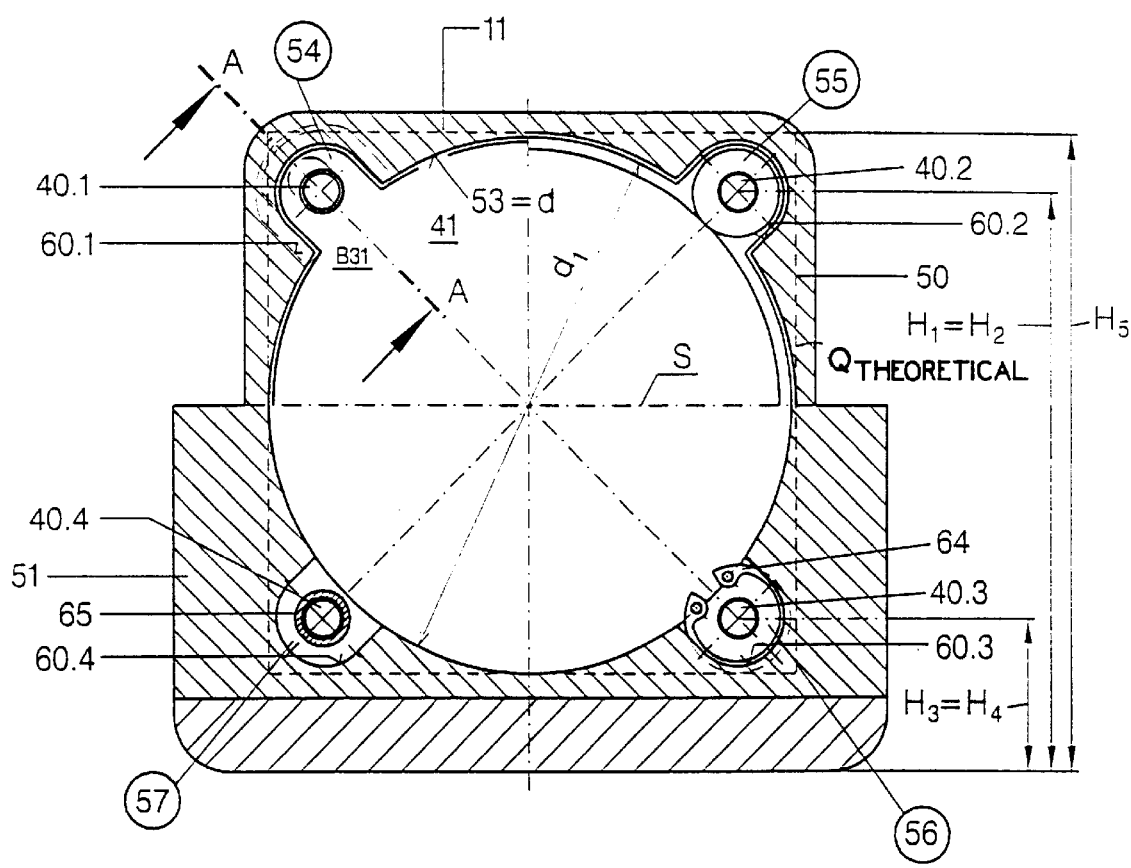
FIG. 2 Axial view showing a section view cut for A—A of FIG. 1b.

The intermediate elements are designated in each case with B12, B22, B3z and B4z. The friction surface-carrying elements B1n to B4n form there the outer lamellae. For the transformation of the brake energy into heat, the outer lamellae are stationary, while the inner lamellae which are formed by the intermediate elements B1zn to B4zn are coupled with the gear element to be braked down. The fixed establishment of the outer lamellae occurs over the bar-form guide elements 40. These extend preferably at least over the axial extent of the mechanical gear part 4. The housing 11 has in this section, essentially over the axial extent, a constant inside diameter d1. Preferably, as represented in FIG. 2, four bar-form guide elements 40.1 to 40.4 are provided which are preferably arranged in the gear housisng with constant spacing to one another in circumferential direction. The gear housing 11 itself, at least in the zone which takes up the mechanical gear part 4, constructed in such manner that this has a substantially cylindrical inside cross section. Preferably the gear housing, as viewed in axial direction, has in the zone of the mechanical gear part 4 an essentially constant inside diameter. The inside diameter is laid out in such manner that essentially the rotating gear elements and components can rotate freely under utilization of the maximally possible construction space. The guide element 40 is preferably made in one piece, but it can also consist of several sections. In the unmounted state of the mechanical gear part 4, the interior space which is here designated with 41, is substantially empty. For the assembling first the bar-form guide elements are brought into the corresponding positions, or suspended in a corresponding manner on the gear housing, and the individual gear elements are successively threaded-on on these guide elements in correspondence to the desired arrangement. All the components of the mechanical gear part can be threaded-on successively in the assembling from the separation place T to the housing cover 42. This offers the advantage that with the threading-on technique and the constant inside diameter the individual components in the mechanical gear part 4 are interchangeable, and therewith in a simple manner middle offdrives or all-wheel offdrives can be realized. The assembling occurs only from one side and, namely, in the case represented, from the side of the cover 42. The assembling takes shape simply and is achievable within the shortest possible time. The individual planetary wheel sets are interchangeable in respect to their arrangement. Furthermore, different variant offdrives are realizable.

The axial fixing into position of the individual gear elements occurs there by means of security elements, for example in the form of security rings or stops. Besides, the outer lamellae there are also conducted so-called partitions 44, 45, 46 and 47. Furthermore there occurs likewise over the guide elements 40.1 to 40.4 the fixed arranging or supporting of gear elements, for example lamellae carriers or the like.

Figure 1B:
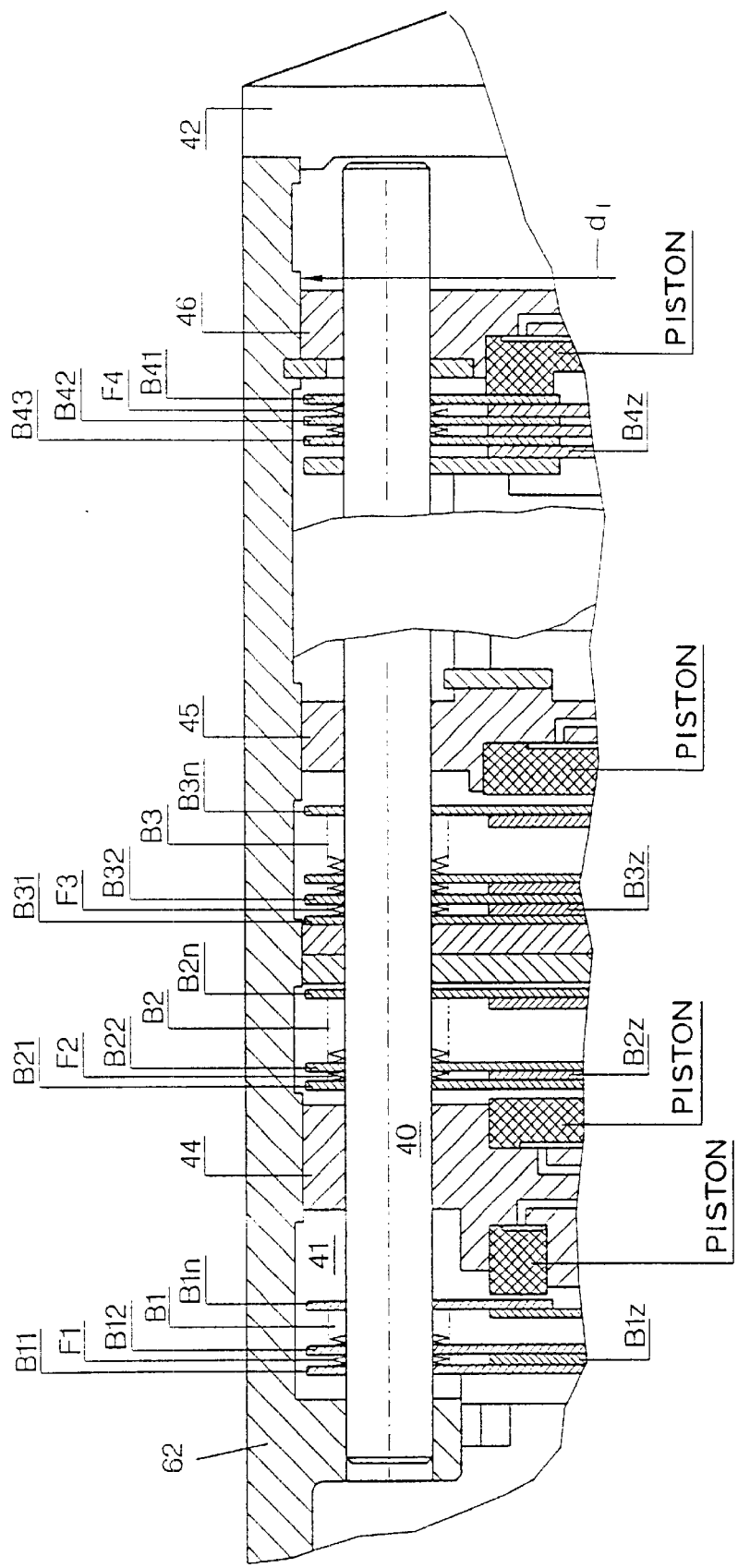

FIG. 2 explains a cross section corresponding to the section A—A according to FIG. 1. There is evident the gear housing 11, which can be subdivided in the case represented into two partial zones 50 and 51. The first partial zone 50 forms there the upper housing part in installation position, the second partial zone 51 the housing part arranged in installation position underneath the gear symmetry axis S. The gear housing 11, as already explained in the description of FIG. 1, has an essentially cylindrical inner contour 53, which encloses an inner space 41. The inner contour 53 can be described by the diameter d1. This extends, as already thoroughly explained in the statements for FIG. 1, essentially over the entire axial extent of the mechanical gear part 4. Means are allocated for the reception and tying-on of the gear elements in radial direction, and for the securing against twisting in circumferential direction. These means are formed by the guide elements 40.1 to 40.4. These are allocated to the inner circumference described by the diameter d1 in such manner that these are arranged, in installation position of the gear unit 1, at a height H1 to H4 which, in regard to the dimensions, is less than the dimension H5 described by the maximal extend of the inner contour 53 in installation position in height direction. The guide elements, as clearly shown in FIG. 2, are arranged in the corner zones 54, 55, 56 and 57 of the housing 11, it being possible to describe these corner zones by an allocation of a quadrate or rectangle to the inner contour 53. The corner zones 54 to 57 are described there in installation position by allocation of the theoretical quadrate $Q_{theocretic}$ in which the diameter d1 circumscribed by the inner contour 53 is arranged in the quadrate and both the theoretical quadrate $Q_{theocretic}$ drawn in it and also the inside diameter d of the inner contour 53 of the housing, have the same axes of symmetry S1 and S2, respectively. For the reception of the guide elements, corresponding recesses are provided in the housing. These are designated here for the individual guide elements in each case with 60.1 to 60.4. The arrangement of these recesses 60.1 to 60.4 occurs there outside of a zone in the gear housing which is described by the maximal extent of the inner contour of the respective axis of symmetry of the gear unit in height or width direction, i.e, with use of an essentially rectangular housing outer form and of an essentially cylindrical housing inner contour 53, only the most material-intensive inner zones 54 to 57 of the housing 11 are used for the reception of the guide elements 40.1 to 40.4. Additional construction space in height or width direction is not needed. The inner space 41 can be formed with a maximally possible diameter d1, since in height and width directions no additional construction space has to be provided for the tying-on of the gear elements. The gear housing 11 itself can be provided with a relatively thin housing wall in the zones free from the worked-in recesses 60.1 to 60.4. The recesses 60.1 to 60.3 form so-called engagement pockets, into which there can be introduced the guide elements 40.1 to 40.4. Preferably there is provided in axial direction, as made clear in FIG. 1, a possibility for the suspending or for the suspended bearing of the guide elements 40.1 to 40.4. This is designated in 62 in FIG. 1. In addition the guide elements can also be conducted in the partitions which extend in radial direction over the entire interior space. FIG. 2 shows, for example, the tying-on of the friction surface-carrying element B31. For the tying-on to the guide elements 40.1 to 40.4, four possible and schematicalaly simplified variant executions are represented in FIG. 2. Preferably for the axial fixing of an element the same axial security elements are used. On the guide element 40.1 the axial securing occurs by use of shims, in the guide element 40.3 by means of a security ring 64 and on the guide, element 40.4 by means of sleeves 65. For the threading of the individual gear elements onto the bar-form guide elements 40.1 to 40.4, these have corresponding passage openings. Preferably the gear elements are executed in such manner that these have, in addition to their circular cross section, projections on which there are made the recesses or passage openings. This offers the advantage that the remaining construction space, in particular the cylindrical interior space 41 can be utilized essentially fully and contains no additional troublesome elements. In particular in tying-on of the outer lamellae in correspondence to FIG. 2, there can be used for the force transfer a surface which corresponds essentially to the surface describable by the inside diameter d1.

Preferably the tying-on of the gear elements occurs in all four possible corner zones 53, to 57. The guide elements 40.1 to 40.4 and the corresponding projections on the gear elements are correspondingly arranged with constant spacing, viewed in circumferential direction with respect to the inner contour 53 of the gear unit 1. There is also the possibility, however, of finding an essentially symmetrical arrangement which differs from the arrangement in the corner zone. Further, it is not compulsorily required that a tying-on be undertaken in all four corner zones. For the twist securing in circumferential direction, at least two guide elements are required.

Preferably the braking arrangements B1 to B4 are equipped with a device for the resetting of actuating elements. For this purpose there is provided in each case, between two adjacent friction surface-carrying elements, a spring storage unit which is likewise guided by the guide elements—according to FIG. 1 the guide element 40.1—and which is prestensionable on generation of the frictional closure between the friction surface-carrying elements and the intermediate element. In he case represented there is provided between the friction surface-carrying elements of the braking arrangement B11 a spring storage unit F1 or B2, F2, B3-F3 and B4, F4. The spring storage units are arranged there always outside of the friction surface-carrying intermediate elements, so that in this respect no collision of any kind can occur between the spring storage units and the friction surface-carrying intermediate elements. Preferably at least between the first two frction surface-carrying elements of a braking arrangements there are arranged corresponding spring storage unit arrangements. This for of execution offers the advantage that by reason of the action of the spring storage unit between the individual surface-carrying elements, in each case an oppositely directed force acts on the latter, so that a rapid separation becomes possible, with complete releasing of the friction closure. The spring storage arrangement there acts at least indirectly over the friction surface-carrying elements on the actuating element, in particular a piston. The actuating elements, i.e the pistons, can be acted upon, for example, hydraulically or pneumatically. The individual friction surface-carrying elements and the intermediate elements then no longer have to remain clothes free (uncovered ?) (–freikleiden). There always occurs a forced separation at least in the zone in which the spring storage unit is arranged.

The arrangement of the spring storage units between the individual friction surface-carrying elements offers the advantage, further, that the dimensions of the friction surface-carrying elements in radial direction is no longer dependent on the size of the interior dimensions of the gear housing, with account taken of the required construction space for the device for the at least indirect resetting of actuating elements. The arrangement of spring storage units between the friction surface-carrying elements connected with friction closure over an intermediate element offers, further, the advantage of a space-saving execution of the resetting device in axial direction, which in tarn has a positive effect on the gear construction length.

What is claimed is:

1. A gear unit comprising:
    a gear housing having an essentially cylindrical interior space for the reception of individual gear elements;
    a housing cover disposed at an axial end of said cylindrical interior space of said housing;
    a device for the at least indirect resetting of at least one of actuating elements and braking arrangements, said braking arrangement having at least two friction surface-carrying elements, the friction surfaces of which are connectable with one another with friction closure over a further friction surface-carrying intermediate element;
    at least two bar-form elements extending axially relative to said cylindrical interior space and disposed in recesses connected with said cylindrical interior space, said bar-form elements directly mounting said device for the at least indirect resetting of at least one of actuating elements and braking arrangements;
    wherein said recesses are disposed in a space outside of a zone of the greatest dimension of the cylindrical interior space; and
    wherein said housing cover is free from axial force action through said device for the at least indirect resetting of at least one of actuating elements and braking arrangements.

2. The gear unit according to claim 1, wherein said cylindrical interior space has an essentially constant diameter over the entire axial extent.

3. The gear unit according to claim 2, wherein said recesses are located in the corner zones of said housing which is defined by the portion between said cylindrical interior space and a theoretically constructible quadrate with a side dimension greater than or equal to the diameter of said cylindrical interior space, said theoretically constructible quadrate and said cylindrical interior space having identical axes of symmetry.

4. The gear unit according to claim 3, wherein said bar-form elements are arranged in all four corner zones with essentially constant spacing from one another in circumferential direction of the interior space.

5. Gear unit according to claim 4, wherein said recesses in the gear housing wall connected with the cylindrical interior space, are constructed for the guidance of projections complementary thereto on at least one of said individual gear elements and said device for the at least indirect resetting of at least one of actuation elements and braking arrangements.

6. The gear unit according to claim 5, wherein said individual gear elements are placed upon said bar-form elements.

7. The gear unit according to claim 6, further comprising means for the limiting of axial movability of at least one of said individual gear elements and said device for the resetting of actuating elements.

8. The gear unit according to claim 7, further comprising:
    a mechanical gear part;
    a hydrodynamic gear part; and
    wherein said cylindrical interior space of said gear housing has a constant diameter, as viewed in axial direction, at least over the zone of said mechanical gear part.

9. The gear unit according to claim 1, wherein said recesses are located in the corner zones of said housing which is defined by the portion between said cylindrical interior space and a theoretically constructible quadrate with a side dimension greater than or equal to the diameter of said cylindrical interior space, said theoretically constructible quadrate and said cylindrical interior space having identical axes of symmetry.

10. The gear unit according to claim 1, wherein said recesses in the gear housing wall connected with the cylindrical interior space, are constructed for the guidance of projections complementary thereto on at least one of said individual gear elements and said device for the at least indirect resetting of at least one of actuation elements and braking arrangements.

11. The gear unit according to claim 1, wherein said individual gear elements are placed upon said bar-form elements.

12. The gear unit according to claim 1, further comprising means for the limiting of axial movability of at least one of said individual gear elements and said device for the resetting of actuating elements.

13. The gear unit according to claim 1, further comprising:

a mechanical gear part;

a hydrodynamic gear part; and wherein said cylindrical interior space of said gear housing has a constant diameter, as viewed in axial direction, at least over the zone of said mechanical gear part.

14. The gear unit according to claim 1, wherein said bar-form elements are arranged in all four corner zones with essentially constant spacing from one another in circumferential direction of the interior space.

* * * * *